(12) United States Patent
Fu

(10) Patent No.: US 11,351,994 B2
(45) Date of Patent: Jun. 7, 2022

(54) PASSAGE DETERMINATION METHOD AND DEVICE

(71) Applicant: Beijing Xiaomi Mobile Software Co., Ltd., Beijing (CN)

(72) Inventor: Wenjun Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 317 days.

(21) Appl. No.: 16/658,335

(22) Filed: Oct. 21, 2019

(65) Prior Publication Data

US 2020/0130681 A1 Apr. 30, 2020

(30) Foreign Application Priority Data

Oct. 30, 2018 (CN) .......................... 201811279865.0

(51) Int. Cl.
*B60W 30/095* (2012.01)
*B60K 35/00* (2006.01)
(Continued)

(52) U.S. Cl.
CPC ......... *B60W 30/0953* (2013.01); *B60K 35/00* (2013.01); *B60W 30/0956* (2013.01); *B60W 30/18163* (2013.01); *B60W 50/14* (2013.01); *G06F 3/011* (2013.01); *G06V 20/20* (2022.01); *G06V 20/58* (2022.01); *G06V 20/584* (2022.01);
(Continued)

(58) Field of Classification Search
CPC ......... B60W 30/0953; B60W 30/0956; B60W 30/18163; B60W 50/14; B60W 2050/146; B60K 35/00; B60K 2370/1529; B60K 2370/177; B60K 2370/179; G06F 3/011; G06F 2203/012; G06K 9/00671; G06K 9/00805; G06K 9/00825
See application file for complete search history.

(56) References Cited

U.S. PATENT DOCUMENTS

| | | | | |
|---|---|---|---|---|
| 2007/0047809 | A1* | 3/2007 | Sasaki | G06K 9/00791 382/170 |
| 2008/0049150 | A1* | 2/2008 | Herbin | B60Q 9/00 348/744 |

(Continued)

FOREIGN PATENT DOCUMENTS

| | | |
|---|---|---|
| CN | 106218720 A | 12/2016 |
| CN | 106228110 A | 12/2016 |

(Continued)

OTHER PUBLICATIONS

Extended European Search Report for European Application No. 19206190.1, dated Mar. 16, 2020.
(Continued)

*Primary Examiner* — Richard M Camby
(74) *Attorney, Agent, or Firm* — Finnegan, Henderson, Farabow, Garrett & Dunner, L.L.P.

(57) ABSTRACT

A passage determination method includes: determining a target space region corresponding to a vehicle in a driving direction based on a real-time road image of the driving direction in a real scene; determining an actual size of the target space region; and determining whether the vehicle is able to pass through the target space region according to a magnitude relationship of the actual size and a safe size of the vehicle.

15 Claims, 13 Drawing Sheets

(51) Int. Cl.
  *B60W 30/18* (2012.01)
  *B60W 50/14* (2020.01)
  *G06F 3/01* (2006.01)
  *G06V 20/20* (2022.01)
  *G06V 20/58* (2022.01)
(52) U.S. Cl.
  CPC .......................... *B60K 2370/1529* (2019.05); *B60K 2370/177* (2019.05); *B60K 2370/179* (2019.05); *B60W 2050/146* (2013.01)

(56) References Cited

U.S. PATENT DOCUMENTS

| 2011/0144859 | A1 | 6/2011 | Suk et al. |
| 2014/0218481 | A1* | 8/2014 | Hegemann ............ H04N 13/271 |
| | | | 348/46 |
| 2014/0309913 | A1* | 10/2014 | Ricci .................. G06K 9/00288 |
| | | | 701/117 |
| 2016/0194004 | A1 | 7/2016 | Ann |
| 2017/0287186 | A1* | 10/2017 | Saito ....................... G06T 7/521 |
| 2018/0025647 | A1* | 1/2018 | Krnja .................... B62D 15/029 |
| | | | 340/905 |
| 2018/0374353 | A1* | 12/2018 | Hosokawa ......... G01C 21/3446 |

FOREIGN PATENT DOCUMENTS

| CN | 106485233 A | 3/2017 |
| CN | 106904165 A | 6/2017 |
| CN | 107521411 A | 12/2017 |
| CN | 107650794 A | 2/2018 |
| CN | 108216242 A | 6/2018 |

OTHER PUBLICATIONS

International Search Report Issued in Application No. PCT/CN2018/124422, from ISA/CN State Intellectual Property Office of the People's Republic of China, dated Jul. 29, 2019, 2 pages.

* cited by examiner

Displaying an indication information for instructing a user to adjust a coverage of the real scene until the coverage at least comprising the vehicle — 1001

Determining the safe size of the vehicle in response to the vehicle being detected — 1002

PASSAGE DETERMINATION METHOD AND DEVICE

CROSS REFERENCE

This application is based upon and claims priority to Chinese Patent Application No. 201811279865.0, filed on Oct. 30, 2018, the entire contents thereof are incorporated herein by reference.

TECHNICAL FIELD

The present disclosure relates to the field of virtual reality technology, and particularly to a passage determination method and a device thereof, an electronic device and a computer readable storage medium.

BACKGROUND

Augmented Reality (AR) is a new technology that may seamlessly integrate real world information and virtual world information and superimpose virtual information on real world through computer and other science technologies, after entity information (such as visual information, sound, taste, touch, etc.) that is difficult to experience in a certain time and space of the real world is simulated. That is, a real environment and a virtual object are superimposed in the same picture or space in real time to exist simultaneously, to achieve a sensory experience that transcends reality.

However, existing AR devices can only display preset virtual information, and cannot meet requirements of users in some specific scenes.

SUMMARY

According to a first aspect of embodiments of the present disclosure, a passage determination method includes: determining a target space region corresponding to a vehicle in a driving direction based on a real-time road image of the driving direction in a real scene; determining an actual size of the target space region; and determining whether the vehicle is able to pass through the target space region according to a magnitude relationship of the actual size and a safe size of the vehicle.

According to a second aspect of the embodiments of the present disclosure, a passage determination device includes: a processor; and a memory configured to store instructions executable by the processor; wherein the processor is configured to determine a target space region corresponding to a vehicle in a driving direction based on a real-time road image of the driving direction in a real scene; determine an actual size of the target space region; and determine whether the vehicle is able to pass through the target space region according to a magnitude relationship of the actual size and a safe size of the vehicle.

According to a third aspect of the embodiments of the present disclosure, a non-transitory computer readable storage medium is provided having instructions stored thereon that, when executed by a processor of a device, cause the device to perform a passage determination method including: determining a target space region corresponding to a vehicle in a driving direction based on a real-time road image of the driving direction in a real scene; determining an actual size of the target space region; and determining whether the vehicle is able to pass through the target space region according to a magnitude relationship of the actual size and a safe size of the vehicle.

The technical solution provided by the embodiments of the present disclosure may include the following beneficial effects.

In the embodiments of the present disclosure, based on the real-time road image of the driving direction in the real scene, the target space region corresponding to the driving direction of the vehicle is determined, and then the actual size of the target space region is acquired, and then according to a magnitude relationship of the actual size and the safe size of the vehicle, whether the vehicle is able to pass through the target space region is determined. It can be seen that in the present embodiment, by determining whether the vehicle can pass through the target space region, the driving safety can be ensured, thereby avoiding a traffic accident caused by an estimated deviation and improving the driving experience of the user.

It shall be understood that the above general description and the following detailed description are merely exemplary and explanatory and are not intended to be restrictive of the present disclosure.

BRIEF DESCRIPTION OF THE DRAWINGS

The accompanying drawings, which are incorporated in and constitute a part of this specification, illustrate embodiments consistent with the invention, and together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
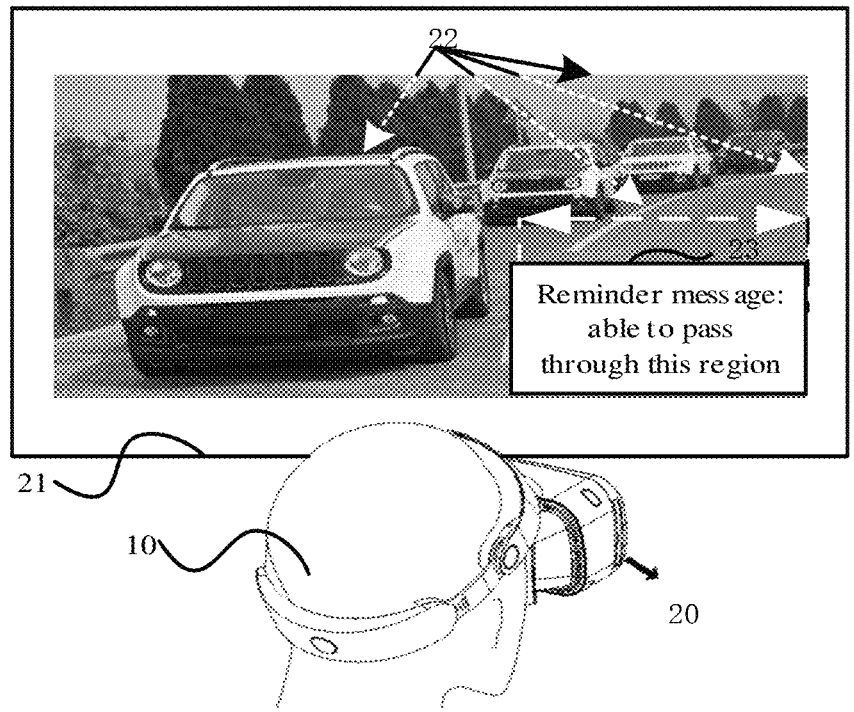
FIG. 1 is a schematic diagram showing an application scene according to an exemplary embodiment.

Embodiments of the present disclosure provide a passage determination method, and FIG. 1 is a schematic diagram showing an application scene according to an exemplary embodiment. As shown in FIG. 1, a user 10 wears an augmented reality device 20 to drive a vehicle (such as a car, a motorcycle, or a bicycle, etc., not shown in the figure) to travel on the road. The user 10 can see a target object 22 such as vehicles driving in the same direction, vehicles driving in an opposite direction, an indication line, etc., in a real scene 21 displayed by the augmented reality device 20. That is, a real-time road image of a driving direction can be obtained. Then, the augmented reality device 20 can determine whether the vehicle is able to pass through a target space region corresponding to the driving direction. In this way, an accident caused by visual estimation error can be avoided, and an experience of wearing the augmented reality device and a driving experience can be improved.

Figure 2:
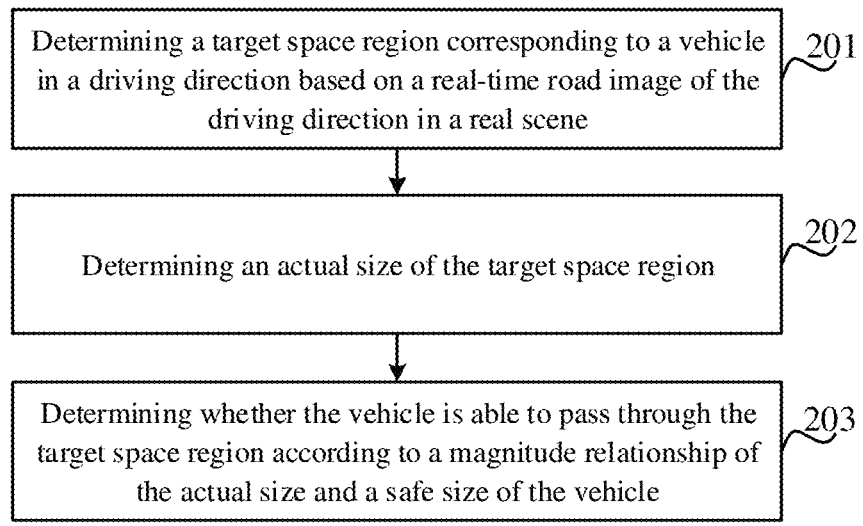
FIG. 2 is a flowchart showing a passage determination method according to an exemplary embodiment.

FIG. 2 is a flowchart diagram showing a passage determination method according to an exemplary embodiment. In an embodiment, the passage determination method can be applied to an augmented reality device, and the passage determination method is performed by the augmented reality device. In another embodiment, the passage determination method can be applied to a system composed of the augmented reality device and a server, and the passage determination method is executed by the system. Messages during a process of execution can be displayed in a real scene for easy access by users. For convenience of description, subsequent embodiments are described by taking the augmented reality device to perform the passage determination method as an example. Referring to FIG. 2, the passage determination method includes step 201 to step 203 in the embodiment.

In step 201, a target space region corresponding to a vehicle in a driving direction is determined based on a real-time road image of the driving direction in a real scene.

In the present step, in the process of driving the vehicle, a camera on the augmented reality device can collect the live road image in the real scene in real time. Then, each of frames of the real-time road image is sent to a processor or pre-stored at a designated location. Then, the real-time road image is read by the processor from the designated location. The designated location may be a memory or a buffer of the augmented reality device.

Figure 3:
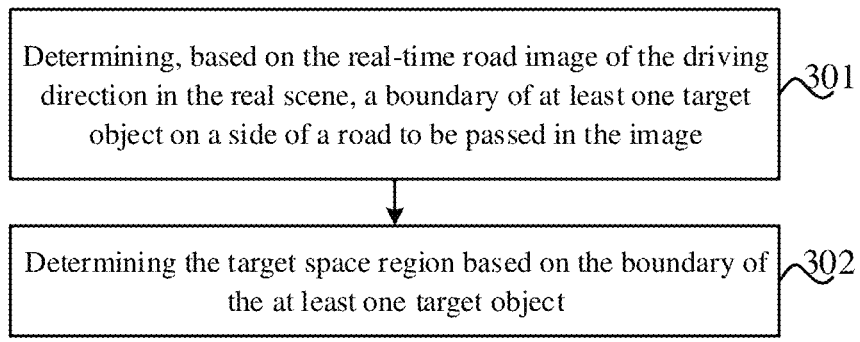
FIG. 3 is a flowchart of determining a target space region according to an exemplary embodiment.

The processor can determine the target space region based on an acquired real-time road image, referring to FIG. 3. The processor reads the real-time road image of the driving direction in the real scene, and determines that a boundary of at least one target object on a side of a road to be passed in the image, in step 301. The target object may be a vehicle in a real scene, a road surface, a driving sign, a height limit bar, a bridge, etc. A type and a number of the target object can be adjusted according to the specific scene. Then, the processor determines the target space region based on the boundary of the at least one target object, in step 302.

Figure 4:
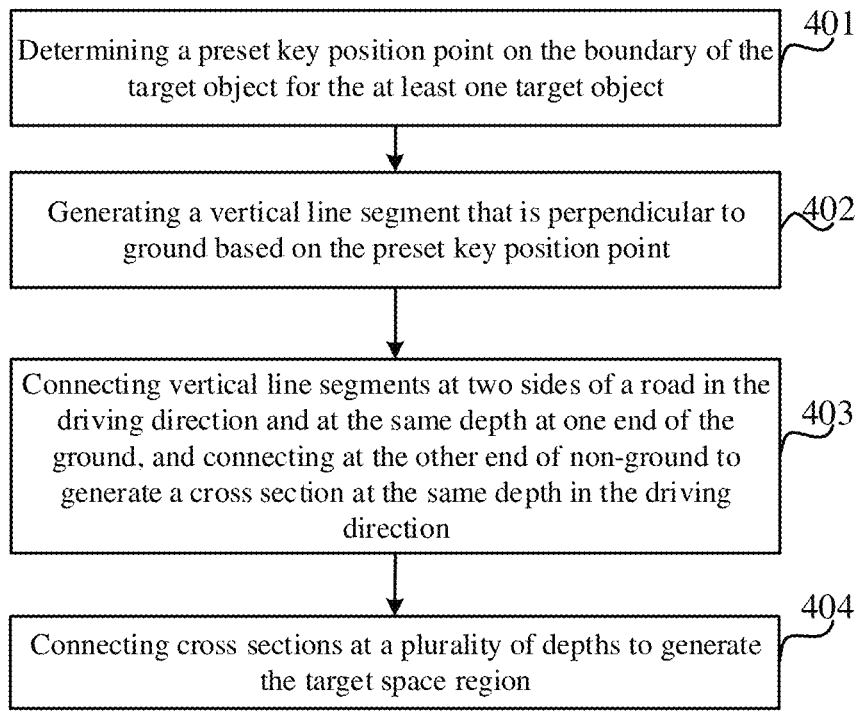
FIG. 4 is a flowchart of determining a target space region according to an exemplary embodiment.

In an embodiment, the processor determines the target space region based on the boundary of the at least one target object, as illustrated in FIG. 4, which includes following steps.

For the at least one target object, the processor may determine a preset key position point on the boundary of the target object in step 401. Then, the processor generates a vertical line segment that is perpendicular to ground based on the preset key position point in step 402. Thereafter, vertical line segments at two sides of the road in the driving direction and at the same depth, are connected at one end of the ground by the processor, and are connected at the other end of non-ground to generate a cross section at the same depth in the driving direction in step 403. Finally, cross sections at a plurality of depths are connected by the processor to generate the target space region in step 404.

Figure 5A:
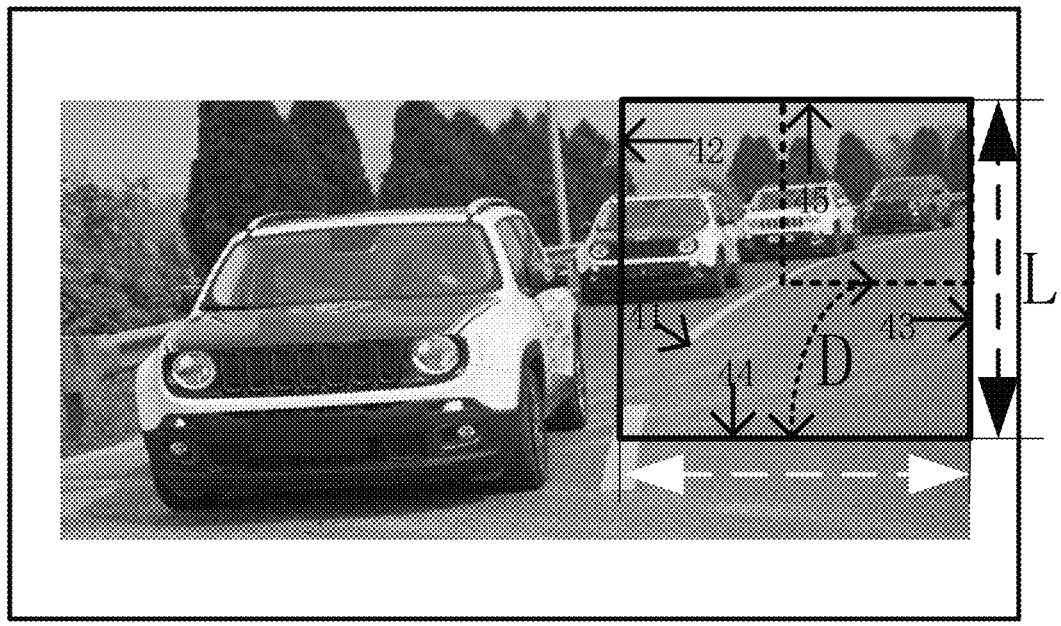
FIG. 5(*a*), FIG. 5(*b*) and FIG. 5(*c*) are schematic diagrams showing an effect of a target space region according to exemplary embodiments.
Figure 5B:
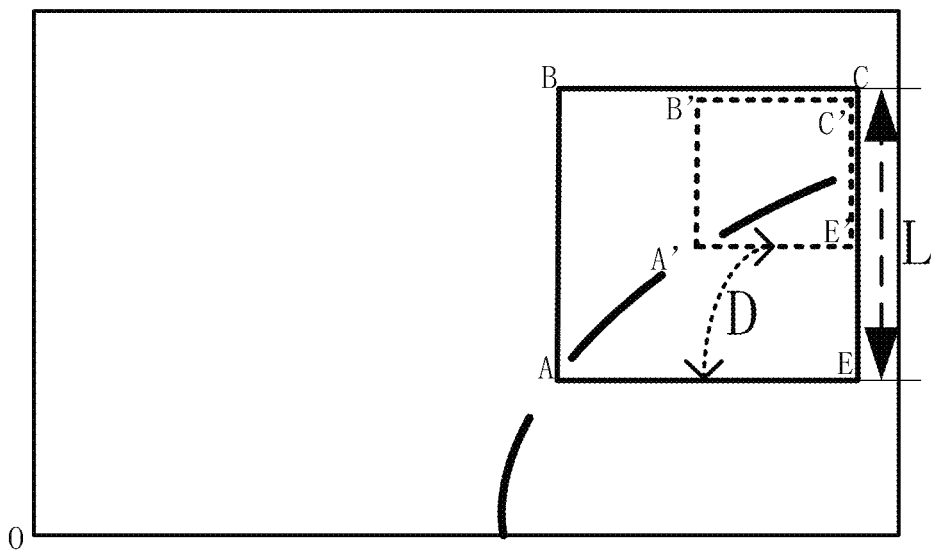

For example, referring to FIG. 5(a) and FIG. 5(b), the plurality of target objects exist in the real-time road image, such as driving cars in the opposite direction of the present car and a road marking line. Since the car does not pass the road marking line, that is to say, compared with the driving cars in the opposite direction, the road marking line is closer to the target space region corresponding to the driving direction. Therefore, in the present embodiment, the preset key position point A and point E can be selected at the road marking line close to the side of a car. A line segment BA is a vertical line segment between generated preset key position point B and the ground. A line segment CE is a vertical line segment between the generated preset key position point E and the ground. The points A and E located at the ground of the two vertical line segments are connected, and The points B and C located at the non-ground of the two vertical line segments are connected, so that a cross section ABCE in the driving direction at the same depth can be obtained. Based on the same manner, a cross section A'B'C'E' in the driving direction at another depth can be generated. Finally, the cross section ABCE and the cross section A'B'C'E' can be connected by the processor to form a target space region. In the embodiment, a length of the vertical line segment can be set according to a safe height of a vehicle to pass.

Further, the preset key position point may be determined on the target object closest to a target space region to be determined. When determining the preset key position point, a preset key point may be taken at every preset distance according to the requirements, or if an obstacle object exists near the target object, a key point may be preset at the position where the obstacle object corresponds to the target object. In addition, for a certain preset key position point, if when the cross section is generated, at the depth of preset key position point, a corresponding vertical line does not exist at an opposite end of the road, the preset key position point may be generated, and a corresponding vertical line is generated at the depth to generate the cross section at the depth.

Figure 5C:
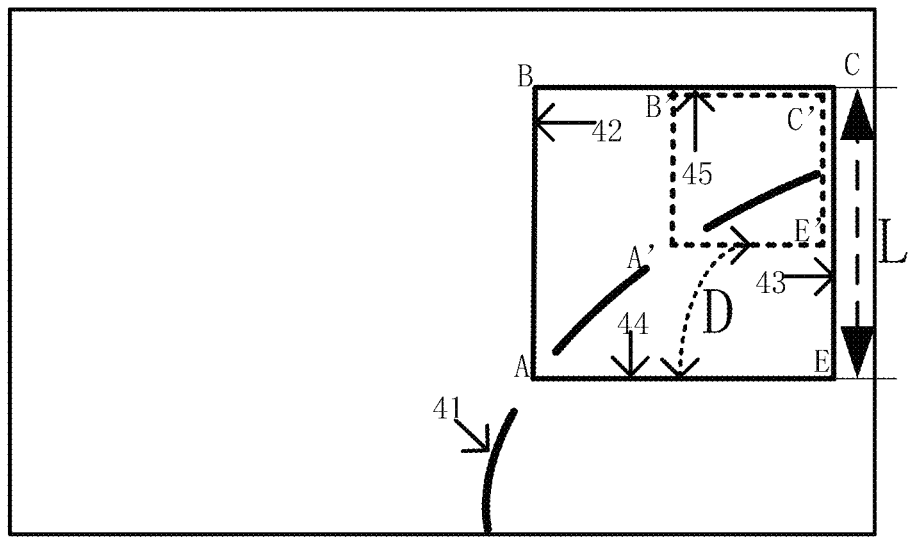

As another example, referring to FIG. 5(a) and FIG. 5(c), the processor can extend the boundary of each of the target objects which is extended to contact other target objects. Referring to FIG. 5(c), a lane 41 is provided on the road, and the lane 41 can be regarded as a fence. An upper end of the fence can be extended to an upper boundary of the real scene, and a lower end is in contact with the ground, thus obtaining a left side boundary 42 of the target space region. A right side boundary of the real scene can be used as a right side boundary 43 of the target space region. Positions of the left side boundary 42 and the right side boundary 43 in contact with the road surface are connected, thereby obtaining a lower boundary 44 of the target space region. The upper boundary of the real scene can be used as the upper boundary 45 of the target space region. Thus, in the present embodiment, the left side boundary 42, the right side boundary 43, the upper boundary 45, and the lower boundary 44 may be enclosed to form a rectangular shape. Multiple rectangles can be obtained by multiple processing, and connections of the multiple rectangles can form a target space region.

In the embodiment, the target space region is region where there are no obstacle objects in this region that can affect driving the vehicle. Further, the target space region may further include a certain depth D, so that an accident may be avoided, and the user has sufficient reaction time for a situation in front.

Figure 6:
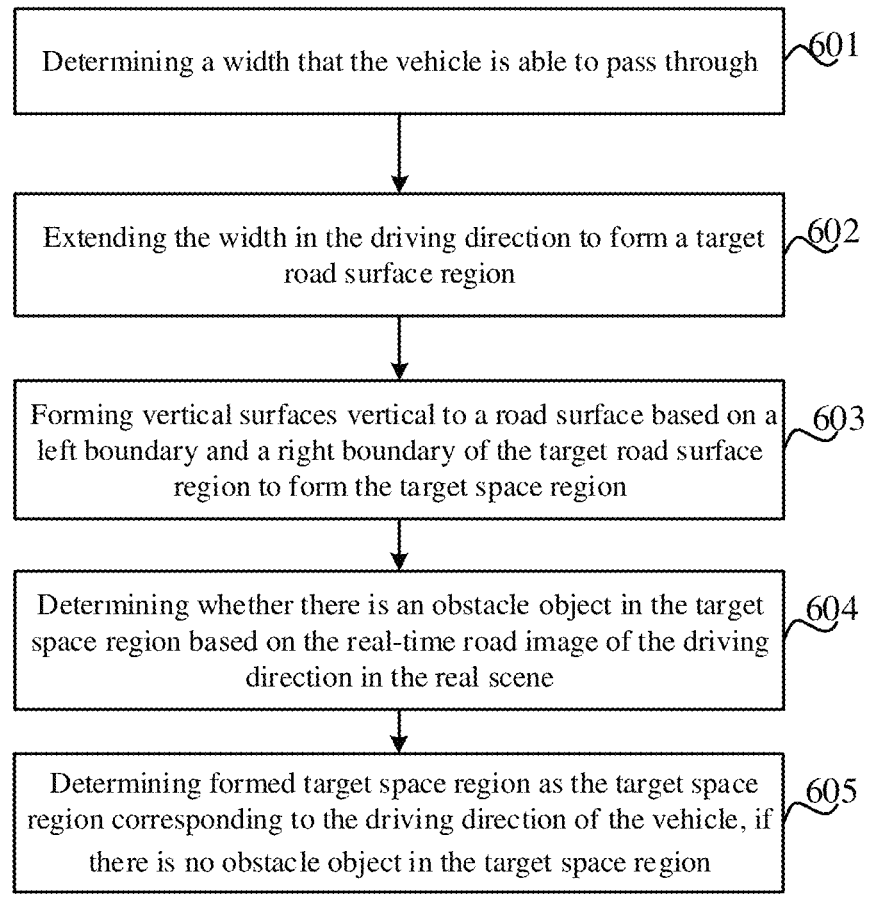
FIG. 6 is a flowchart of determining a target space region according to an exemplary embodiment.

In an embodiment, determining the target space region by the processor based on the boundary of the at least one target object is illustrated in FIG. 6. In step 601, a width that the vehicle is able pass through can be determined by the processor. In step 602, the width in the driving direction is extended by the processor to form a target road surface region. In step 603, vertical surfaces vertical to the road surface are formed by the processor based on the left boundary and the right boundary of the target road surface region to form a target space region. In step 604, whether there is an obstacle object in the target space region is determined by the processor based on the real-time road image of the driving direction in the real scene. In step 605, when there is no obstacle object is determined by the processor, the formed target space region is determined as the target space region corresponding to the driving direction of the vehicle.

Figure 7:
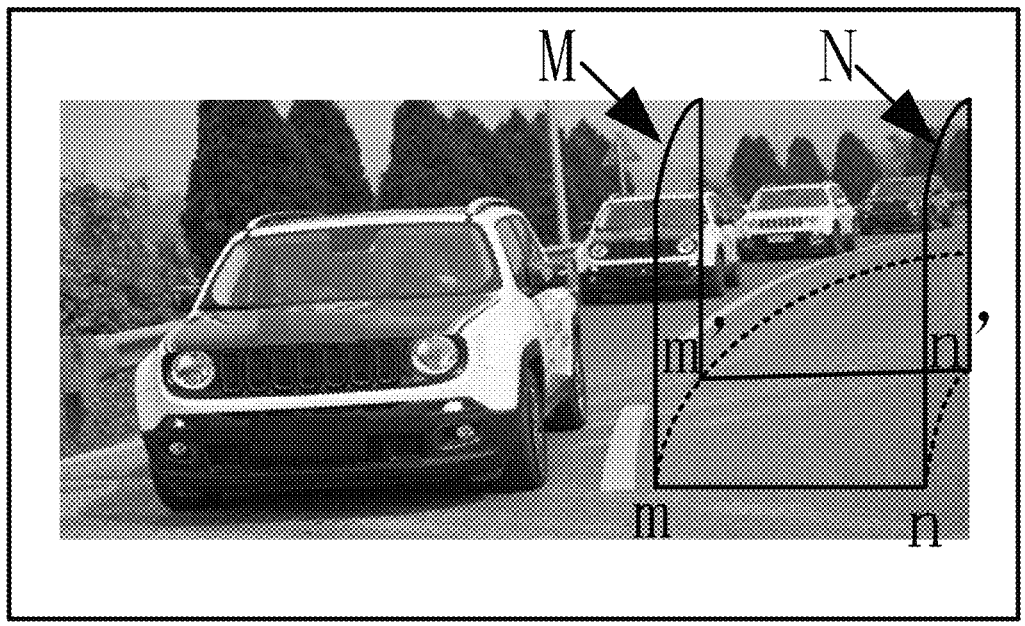
FIG. 7 is a schematic diagram showing an effect of a target space region according to an exemplary embodiment.

For example, referring to FIG. 7, a width mn that the vehicle can pass is determined by the processor, and then the width is extended to m'n' along the driving direction to obtain the target road surface region mm'n'n. Thereafter, the left boundary mm' and the right boundary n'n of the target road surface region mm'n'n are used as the vertical surfaces vertical to the road surface by the processor respectively, that is, a vertical surface M and a vertical surface N. The region enclosed by the target road surface region mm'n'n, the vertical surface M, and the vertical surface N is the target space region. Finally, whether there is an obstacle object is determined by the processor in the target space region based on the real-time road image of the driving direction in the real scene. If there is no obstacle object in the target space region in FIG. 7, the formed target space region is determined by the processor as the target space region corresponding to the driving direction of the vehicle.

Referring back to FIG. 2, in step 202, an actual size of the target space region is determined.

In the present embodiment, acquiring the actual size of the target space region by the processor includes the following manners.

In a first manner, if the processor generates the target space region based on a manner shown in FIG. 6, the width and a height of the target space region are determined, that is, the processor can directly obtain the actual size of the target space region.

Figure 8:
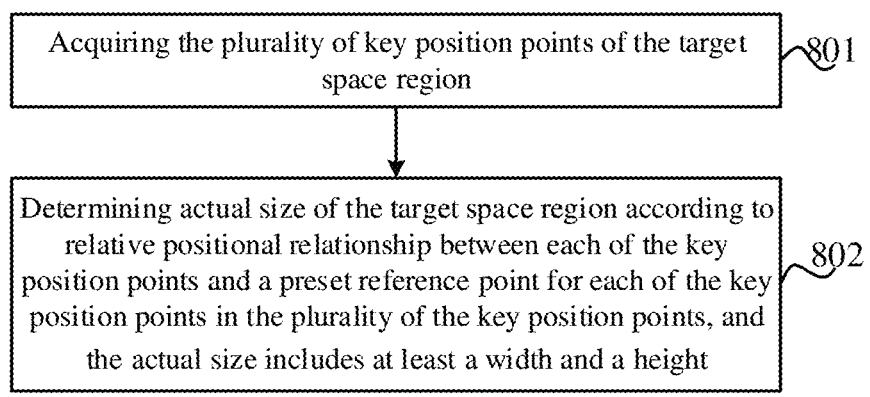
FIG. 8 is a flowchart of acquiring an actual size of a target space region according to an exemplary embodiment.
Figures 9, 10:
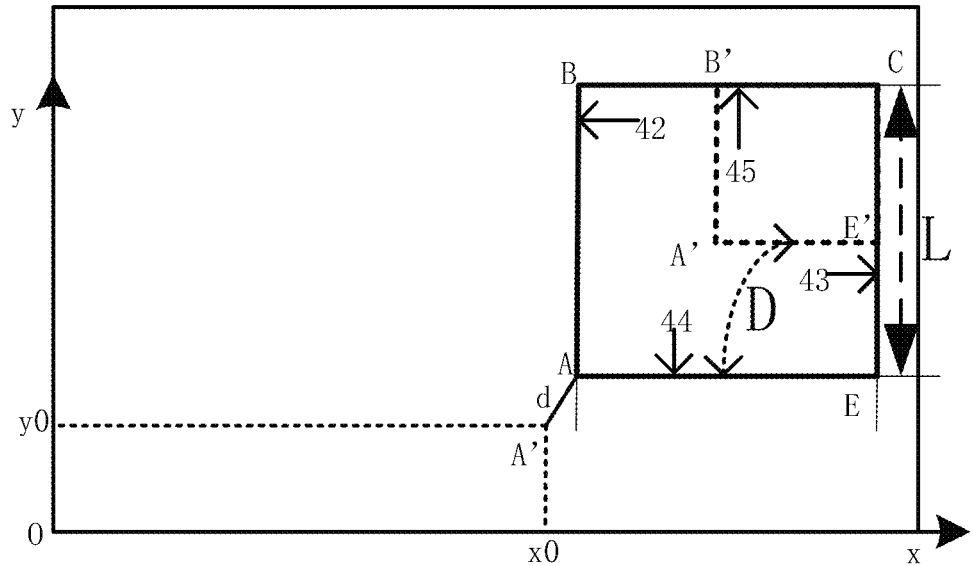
FIG. 9 is a schematic diagram showing an effect of acquiring an actual size of a target space region according to an exemplary embodiment.
FIG. 10 is a flowchart of acquiring a safety size of a target space region according to an exemplary embodiment.

In a second manner, referring to FIG. 8, the plurality of key position points of the target space region may be acquired by the processor in step 801. The key position point may be a vertex of the target space region, a middle point of the boundary, a projection point of the key position point on one boundary on the other boundary, or a shape change position of the target space region. The type of the key position points can be adjusted according to the specific scene. Then, the width W and the height L of the target space region may be determined by the processor according to space coordinates of each of the key position points, thereby obtaining the actual size of the target space region in step 802. In the embodiment, the space coordinates of each of the key position points can be acquired according to the follow manners. Referring to FIG. 9, taking the vertex A of the target space region as an example, distances between a projection point A' on a xoy plane (a reference surface on which the AR device can perform calculation) and a x-axis and a y-axis can be used as a ordinate y0 and an abscissa x0 of the vertex A. The distance d between the vertex A and the projection point A' can be calculated by an image recognition algorithm, that is, A (x0, y0, d). The method for acquiring the space coordinates of vertices B, C, and E is the same as the method for acquiring the space coordinates of the vertex A. Then based on the space coordinates of adjacent two vertices, lengths of each boundary of the target apace region can be calculated.

In a third manner, the target space region may not be designed as a regular shape. In this case, the processor can acquire the distance between key points whose shape are changed and other boundaries, so that multiple widths and multiple lengths of the target space region can be obtained, that is, the actual size includes the multiple widths and the multiple lengths.

In a fourth manner, since the real scene is non-linear, a distance comparison table that is non-linear converted to linear can be set based on a reference point. After the processor acquires the length of each boundary of the target space region, the distance and the length of the boundary are combined to query the distance comparison table, so that actual length of each boundary of the target space region can be obtained.

In step 203, whether the vehicle is able to pass through the target space region is determined according to a magnitude relationship of the actual size and a safe size of the vehicle.

In the present embodiment, the processor can further pre-determine the safe size of the vehicle. The safe size can be directly calculated by the processor, and can further be read by the processor from a specified location.

In a first manner, when the user uses the augmented reality device, a working mode, such as a driving mode, can be adjusted through a control menu, so that the augmented reality device can perform the passage determination method provided by the present disclosure. The safe size of the vehicle may be determined before driving by using the following manners. As shown in FIG. 10, the processor displays indication information for instructing the user to adjust the coverage of the real scene until the coverage at least includes the vehicle in step 1001. The processor can detect whether the real-time road image contains the vehicle, and after the vehicle being detected, the safe size of the vehicle can be calculated based on a proportion of the vehicle in the real-time road image in step 1002. Here, as long as the size of the vehicle can be determined, the coverage may include a part or all of the vehicle. The safe size may include the actual size and an increased size of the vehicle. In the present embodiment, the increased size is set to ensure driving safety of the vehicle, and the increased size can be adjusted according to the specific scene, for example, 10 cm. Finally, the processor stores the safe size of the vehicle to the specified location, which may be a memory, a cache in local of the augmented reality device, or may further be a cloud capable of communicating with the augmented reality device, and may further be a server capable of communicating with the augmented reality device. In the present embodiment, by pre-acquiring the safe size of the vehicle, a calculation time of the processor is reduced, and a real-time performance of the subsequent acquisition of reminder messages can be improved, thereby improving the user's experience of using the augmented reality device and the experience of driving.

In a second manner, the user can adjust the working mode through the control menu. In the process of adjusting the working mode, the user can input the safe size of the vehicle into the augmented reality device.

In a third manner, the user can adjust the coverage of a view field of the augmented reality device to cover a nameplate of the vehicle. The nameplate may include a model, the actual size, the safe size, etc. of the vehicle. Thereafter, the processor can acquire the safe size of the vehicle, for example, the processor can find the safe size of the vehicle on the Internet based on the model. As another example, the processor can acquire the safe size based on the actual size and a safe distance. As another example, the processor can read the safe size directly from the nameplate. In some embodiments, whether the actual size and the safe size are acquired in real time or from the specified position may be determined by the processor during the process of determining the actual size and the safe size by the processor. For example, the processor acquires the actual size and safe size of the vehicle in real time, and the actual size and the safe size may further be read from the specified location, which is the solution to solution to achieve the present application.

After determining the safe size of the vehicle, the processor can compare the actual size and the safe size of the target space region to obtain the magnitude relationship between the two. Then, the processor can determine whether the vehicle is able to pass through the target space region based on the magnitude relationship.

Further, the step of determining the safe size of the vehicle can be performed before the user actually drives. After the safe size is determined as performing once, the safe size can be stored in a location and does not need to be re-determined before each time of driving. The step of re-determining can be initiated according to their own requirements.

In the embodiments of the present disclosure, based on the real-time road image of the driving direction in the real scene, the target space region corresponding to the driving direction of the vehicle is determined, and then the actual size of the target space region is acquired, and then according to the magnitude relationship of the actual size and the safe size of the vehicle, whether the vehicle is able to pass through the target space region is determined. It can be seen that in the present embodiment, by determining whether the vehicle can pass through the target space region, the driving safety can be ensured, thereby avoiding a traffic accident caused by an estimated deviation and improving the driving experience of the user.

Figure 11:
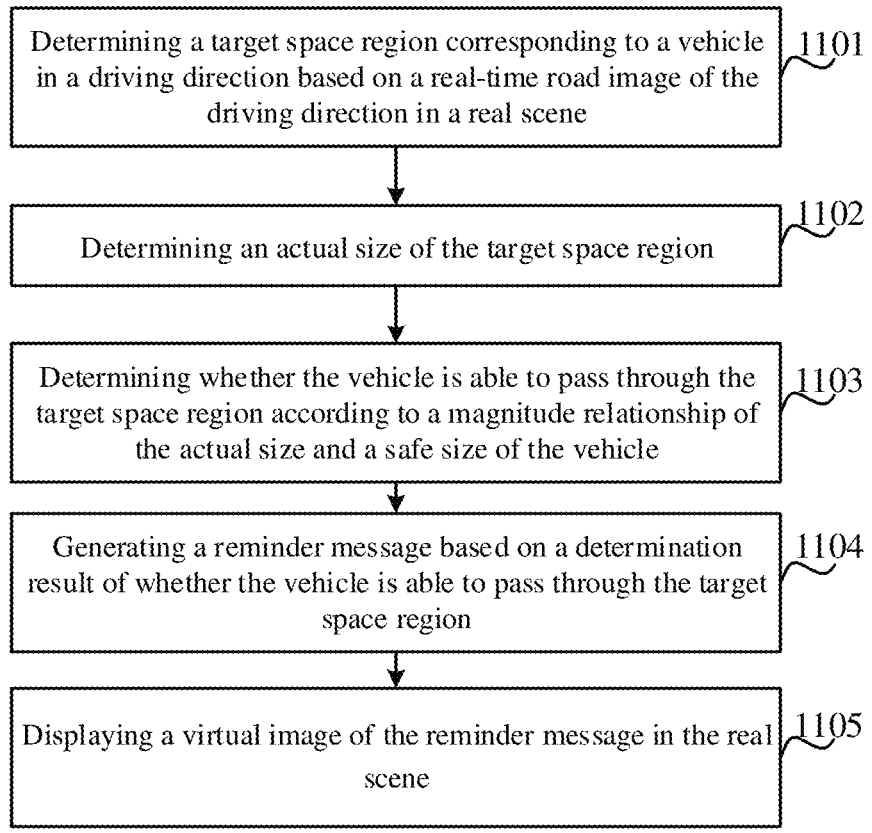
FIG. 11 is a flowchart showing a passage determination method according to another exemplary embodiment.

FIG. 11 is a flowchart showing a passage determination method according to another exemplary embodiment. Referring to FIG. 11, the passage determination method includes the following steps.

In step 1101, a target space region corresponding to a driving direction of a vehicle is determined based on a real-time road image of a driving direction in a real scene, similar to step 201 in FIG. 2.

In step 1102, the actual size of the target space region is determined, similar to step 202 in FIG. 2.

In step 1103, whether the vehicle is able to pass through the target space region is determined based on a magnitude relationship of the actual size and a safe size of the vehicle, similar to step 203 in FIG. 2.

In step 1104, a reminder message is generated based on a determination result of whether the vehicle can pass through the target space region.

In the present embodiment, the processor may generate a reminder message according to the determination result of whether the vehicle can pass through the target space region in the step 1103. For example, if the vehicle is able to pass through the target space region, the reminder message may be that the vehicle is able to pass through this region. The reminder message may be designed as a bullet box, a text, a color identifier, etc., and display manners of the reminder message are not limited.

In step 1105, a virtual image of a reminder message is displayed in the real scene.

In the present embodiment, the processor can send the reminder message to a display device of the augmented reality device to display the image of the virtual reminder message in the real scene.

Figure 12:
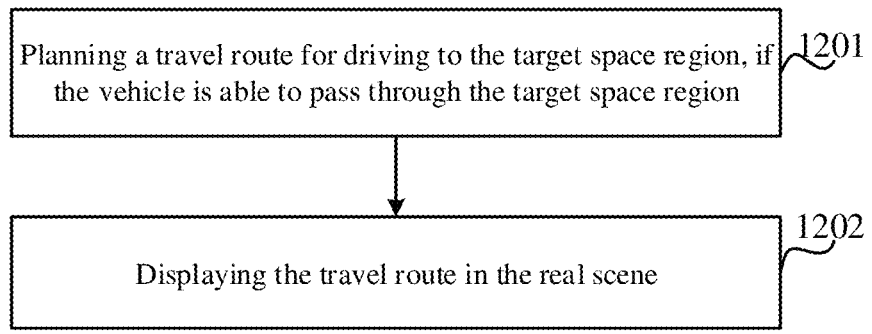
FIG. 12 is a flowchart showing a passage determination method according to another exemplary embodiment.
Figure 13:
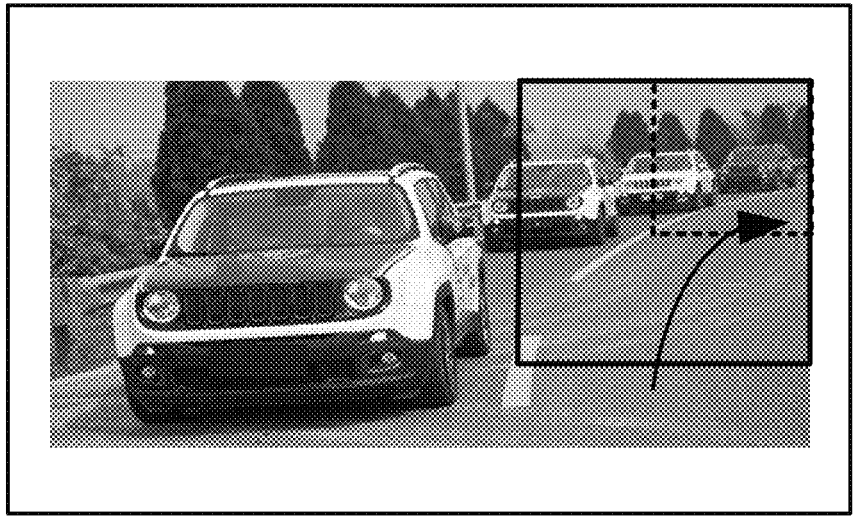
FIG. 13 is a schematic diagram showing an effect of showing a travel route according to an exemplary embodiment.

In some embodiments, referring to FIG. 12, after determining that the vehicle is able to pass through the target space region, the processor can plan a travel route for driving to the target space region in step 1201. Then, the processor displays the travel route in the real scene in step 1202, which may be as indicated by an arrow in FIG. 13.

In the present embodiment, by displaying the reminder message to the user, the user can know in time whether the vehicle can pass through the target space region, thereby avoiding the traffic accident caused by the estimated deviation and improving the driving safety and the driving experience of the user. In addition, in the present embodiment, the travel route is displayed to the user, which facilitates the user to refer to the travel route, and can reduce the driving time of the user.

Figure 14:
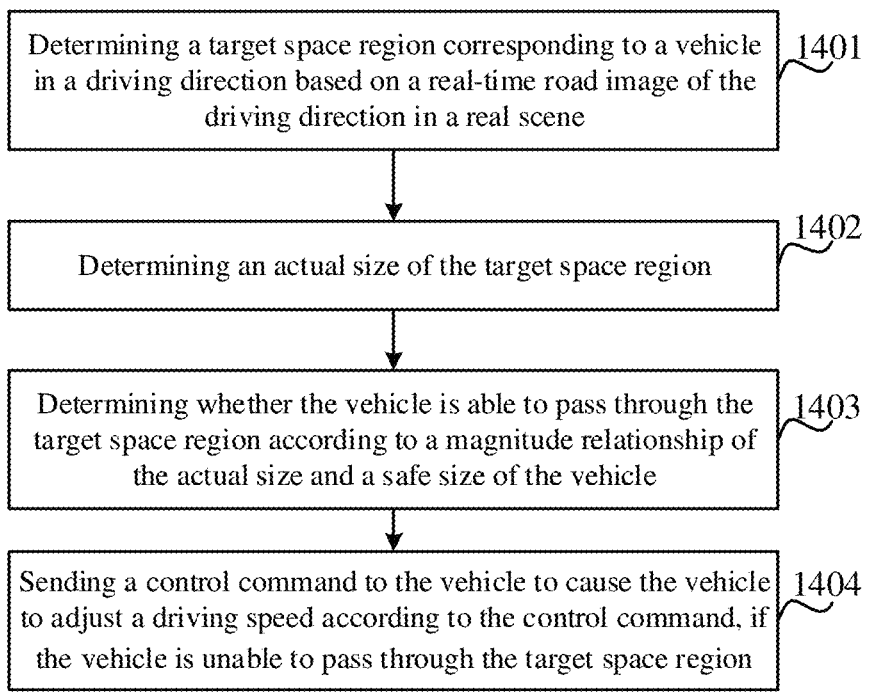
FIG. 14 is a flowchart showing a passage determination method according to another exemplary embodiment.

FIG. 14 is a flowchart showing a passage determination method according to another exemplary embodiment. Referring to FIG. 14, the passage determination method includes the following steps.

In step 1401, a target space region corresponding to a driving direction of a vehicle is determined based on a real-time road image of the driving direction in a real scene, similar to step 201 in FIG. 2.

In step 1402, the actual size of the target space region is determined, similar to step 202 in FIG. 2.

In step 1403, whether the vehicle is able to pass through the target space region is determined based on a magnitude relationship of the actual size and a safe size of the vehicle, similar to step 203 in FIG. 2.

In step 1404, if the vehicle is unable to pass through the target space region, a control command is sent to the vehicle, and the vehicle adjusts a driving speed according to the control command.

In the present embodiment, before wearing the augmented reality device, the augmented reality device can be connected to the vehicle by using a wireless method such as Bluetooth or WiFi, or a wired method. In this way, data interaction between the processor and the vehicle is performed in real time. After determining that the vehicle is unable to pass through the target space region, the processor can send a control command to the vehicle, so that the vehicle can adjust the driving speed of the vehicle according to the control command, or even stop driving.

Further, if a reason of causing the vehicle being unable to travel in the driving direction is an existence of a movable obstacle object (for example, a vehicle, a pedestrian, etc.) in the driving direction, that is, the obstacle object may move such that the target space region is not large enough to allow the vehicle to pass, when a change of the position of the obstacle object is detected, the passage determination method can be triggered to re-determine whether newly determined target space region can be passed.

In the present embodiment, the processor interacts with the vehicle after the vehicle cannot pass through the target space region to control the driving speed of the vehicle, thereby ensuring driving safety. Moreover, in the present embodiment, the travel route is displayed to the user, which facilitates the user to refer to the travel route, and can reduce the driving time of the user. In addition, in the present embodiment, by displaying the reminder message to the user, the user can know in time whether the vehicle can pass through the target space region, thereby avoiding the traffic accident caused by the estimated deviation and improving the driving safety and the driving experience of the user.

Figure 15:
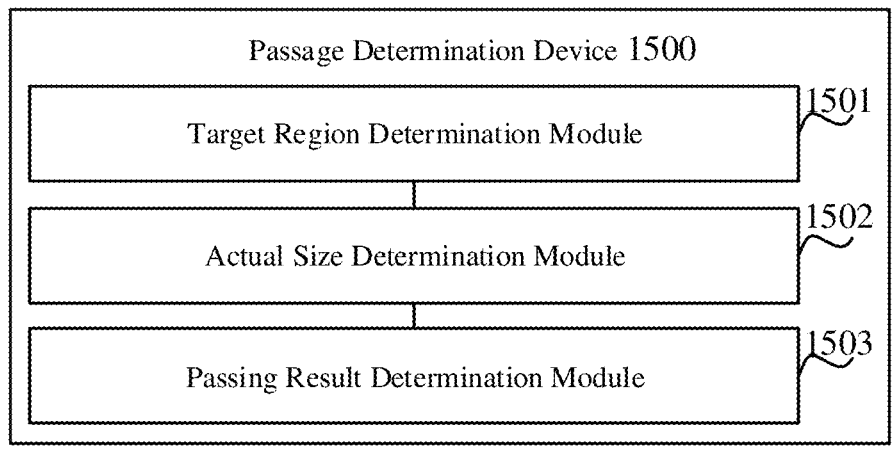
FIG. 15 to FIG. 22 are block diagrams of passage determination devices according to exemplary embodiments.

FIG. 15 is a block diagram showing a passage determination device 1500 according to an exemplary embodiment. The passage determination device 1500 may include a target region determination module 1501 configured to determine a target space region corresponding to a vehicle in a driving direction based on a real-time road image of the driving direction in a real scene; an actual size determination module 1502 configured to determine the actual size of the target space region; and a passing result determination module 1503 is configured to determine whether the vehicle is able to pass through the target space region according to a magnitude relationship of the actual size and a safe size of the vehicle.

In the present embodiment, by determining whether it is possible to pass through the target space region, the user can know in time whether the vehicle can pass through the target space region, thereby avoiding the traffic accident caused by the estimated deviation and improving the driving safety and the driving experience of the user.

Figure 16:
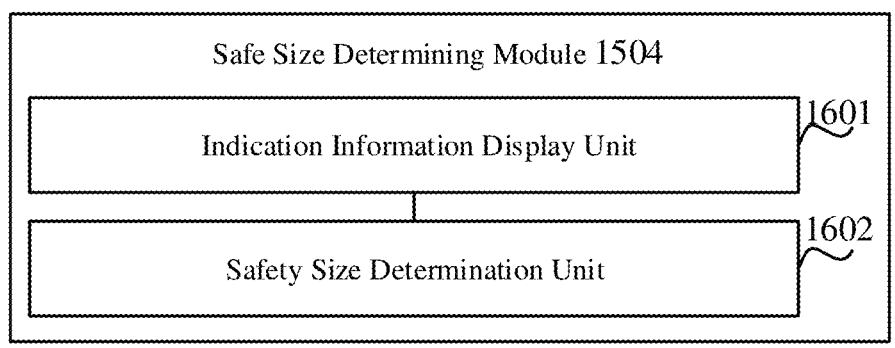

FIG. 16 is a block diagram showing a passage determination device according to another exemplary embodiment. Referring to FIG. 16, on the basis of the passage determination device 1500 shown in FIG. 15, the device further includes: a safe size determining module 1504, and the safe size determining module 1504 includes an indication information display unit 1601 configured to display indication information for instructing the user to adjust the coverage of the real scene until the coverage at least includes the vehicle; and a safety size determination unit 1602 configured to determine the safe size of the vehicle in response to the vehicle being detected.

In the present embodiment, by pre-acquiring the safe size of the vehicle, a calculation time of the processor is reduced, thereby improving the user's experience of using the augmented reality device and the experience of driving.

Figure 17:
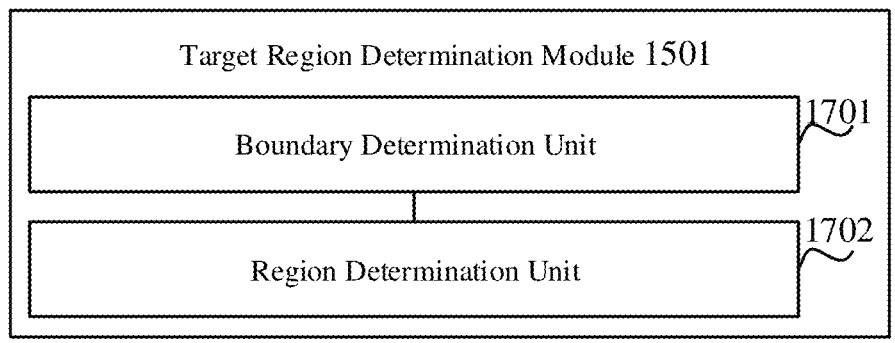

FIG. 17 is a block diagram showing a passage determination device according to another exemplary embodiment. Referring to FIG. 17, on the basis of the passage determination device 1500 shown in FIG. 15, the target region determination module 1501 includes a boundary determination unit 1701 configured to determine a boundary of at least one target object on a side of a road to be passed in the image based on the real-time road image of the driving direction in the real scene; and a region determination unit 1702 configured to determine the target space region based on the boundary of the at least one target object.

Figure 18:
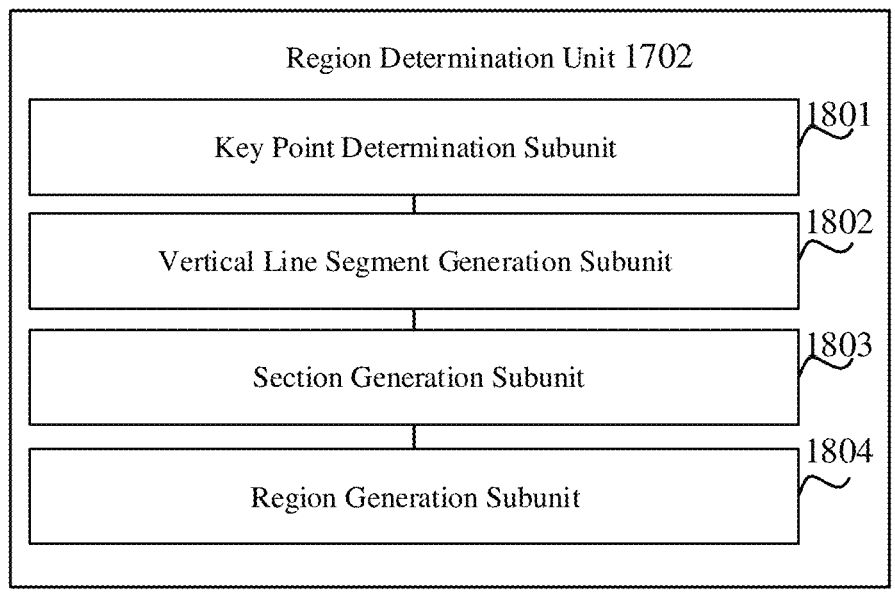

FIG. 18 is a block diagram showing a passage determination device according to another exemplary embodiment. Referring to FIG. 18, on the basis of the passage determination device shown in FIG. 17, the region determination unit 1702 includes a key point determination subunit 1801 configured to determine a preset key position point on the boundary of the target object for the at least one target object; a vertical line segment generation subunit 1802 configured to generate the vertical line segment that is perpendicular to ground based on the preset key position point; a section generation subunit 1803 configured to connect vertical line segments at two sides of the road in the driving direction and at the same depth at one end of the ground, and to connect at one end of non-ground to generate the section at the same depth in the driving direction; and a region generation subunit 1804 configured to connect sections at the plurality of depths to generate the target space region.

Figure 19:
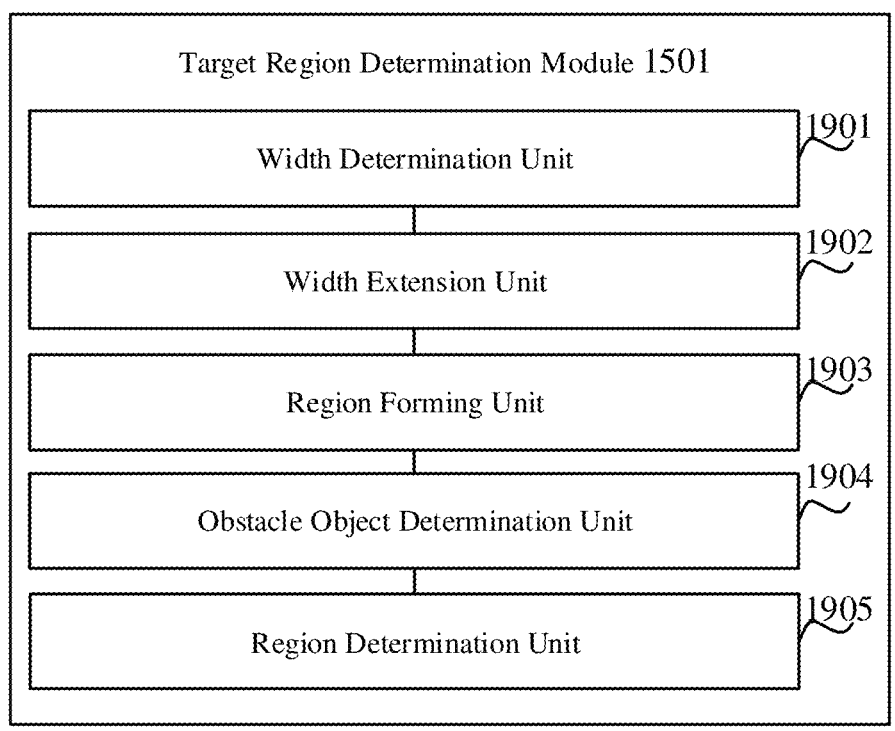

FIG. 19 is a block diagram showing a passage determination device according to another exemplary embodiment. Referring to FIG. 19, on the basis of the passage determination device 1500 shown in FIG. 15, the target region determination module 1501 includes a width determination unit 1901 configured to determine the width that the vehicle is able to pass through; a width extension unit 1902 configured to extend the width in the driving direction to form the target road surface region; a region forming unit 1903 configured to form the vertical surfaces vertical to the road surface based on the left boundary and right boundary of the target road surface region to form the target space region; an obstacle object determination unit 1904 configured to determine whether there is the obstacle object in the target space region based on the real-time road image of the driving direction in the real scene; and a region determination unit 1905 configured to, when there is no obstacle object in the target space region, determine a formed target space region as the target space region corresponding to the driving direction of the vehicle.

Figure 20:
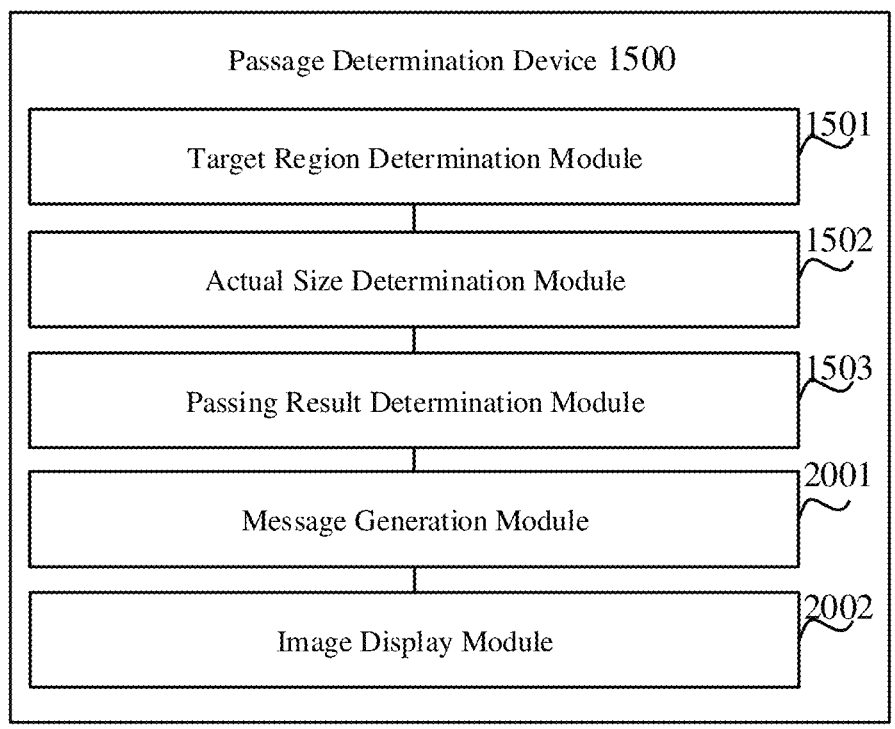

FIG. 20 is a block diagram showing a passage determination device according to another exemplary embodiment. Referring to FIG. 20, on the basis of the passage determination device 1500 shown in FIG. 15, the device 1500 further includes a message generation module 2001 configured to generate a reminder message based on the determination result of whether the vehicle is able to pass through the target space region; and an image display module 2002 configured to display the image of the virtual reminder message in the real scene.

Figure 21:
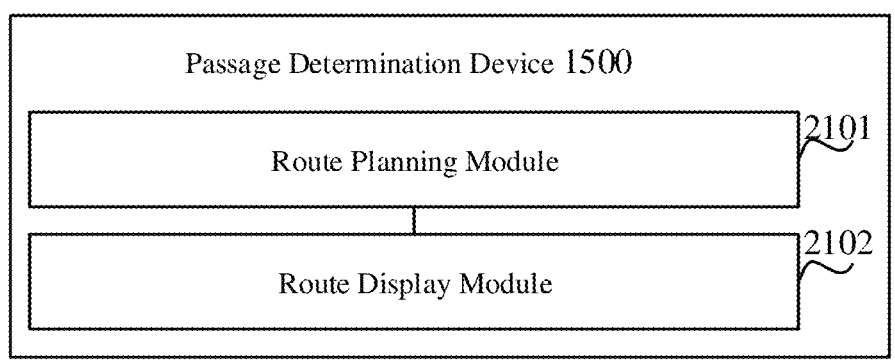

FIG. 21 is a block diagram showing a passage determination device according to another exemplary embodiment. Referring to FIG. 21, on the basis of the passage determination device 1500 shown in FIG. 15, the device 1500 further includes a route planning module 2101 configured to plan the travel route for driving to the target space region when the vehicle is able to pass through the target space region; and a route display module 2102 configured to display the travel route in the real scene.

In the present embodiment, the travel route is displayed to the user, which facilitates the user to refer to the travel route, and can reduce the driving time of the user. In addition, in the present embodiment, by displaying the reminder message to the user, the user can know in time whether the vehicle can pass through the target space region, thereby avoiding the traffic accident caused by the estimated deviation and improving the driving safety and the driving experience of the user.

Figure 22:
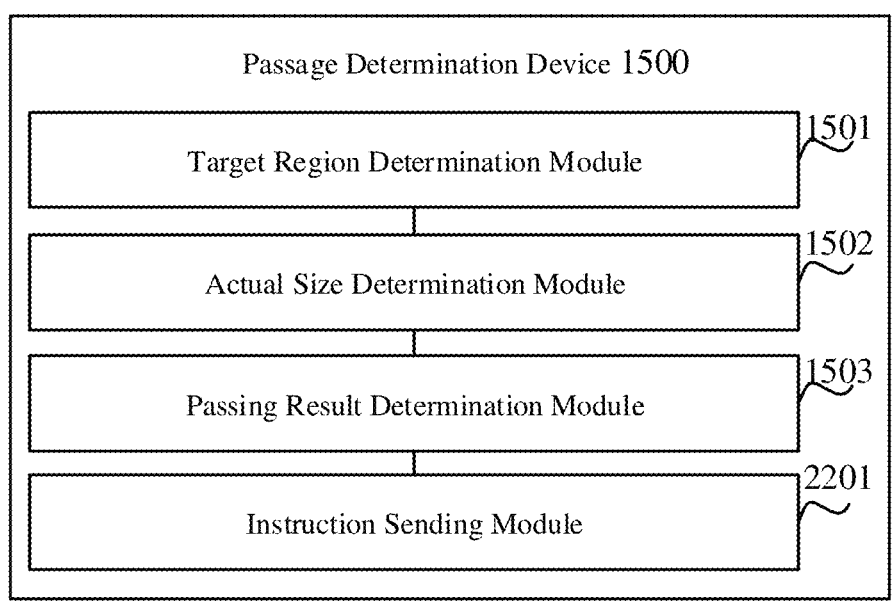

FIG. 22 is a block diagram showing a passage determination device according to another exemplary embodiment. Referring to FIG. 22, on the basis of the passage determination device 1500 shown in FIG. 15, the device 1500 further includes an instruction sending module 2201 configured to, when the vehicle is unable to pass through the target space region, send a control command to the vehicle to cause the vehicle to adjust a driving speed according to the control command.

In the present embodiment, the processor interacts with the vehicle after determining that the vehicle cannot pass through the target space region to control the driving speed of the vehicle, thereby ensuring driving safety. Moreover, in the present embodiment, the travel route is displayed to the user, which facilitates the user to refer to the travel route, and can reduce the driving time of the user. In addition, in the present embodiment, by displaying the reminder message to the user, the user can know in time whether the vehicle can pass through the target space region, thereby avoiding the traffic accident caused by the estimated deviation and improving the driving safety and the driving experience of the user.

Figure 23:
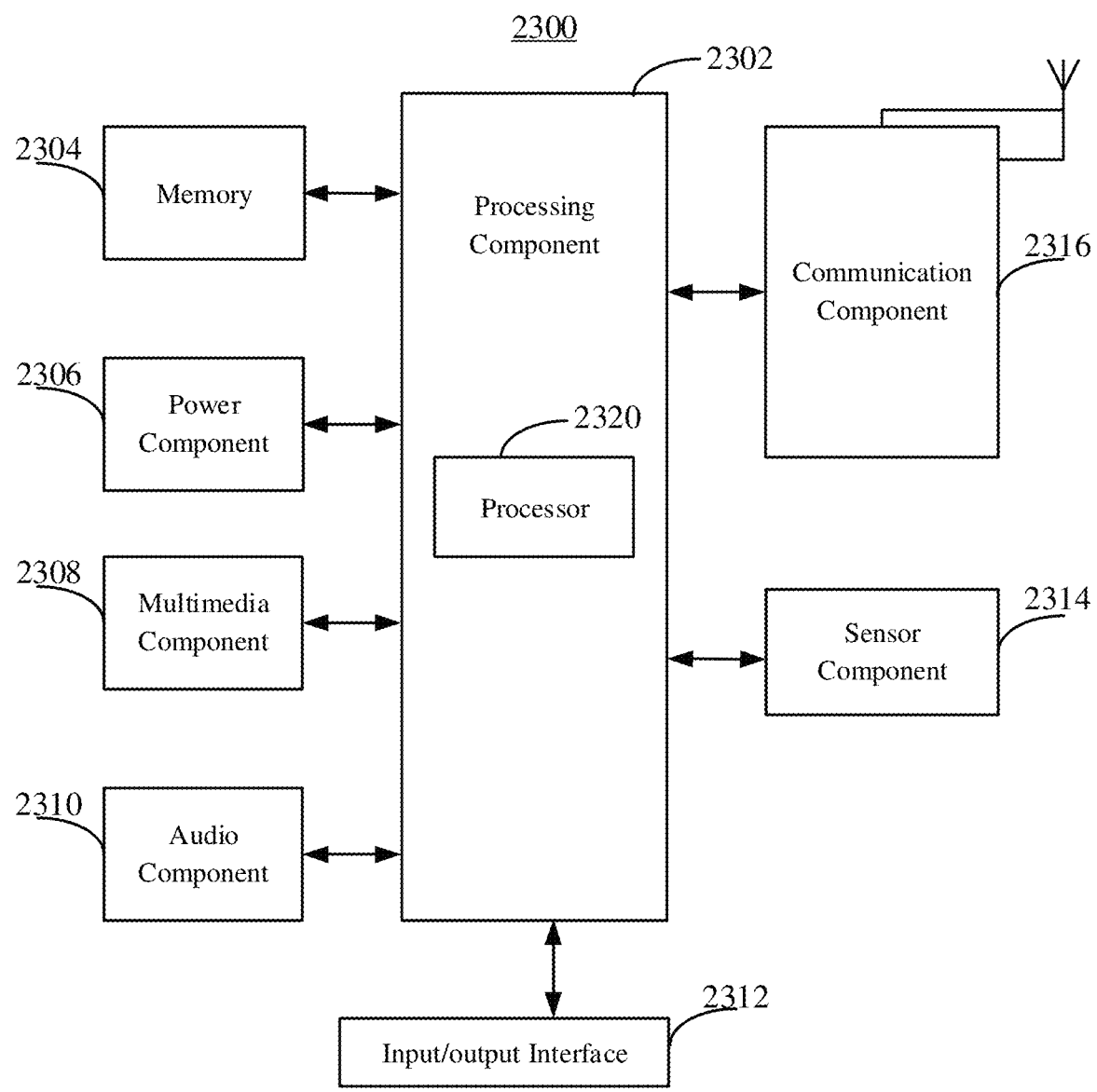
FIG. 23 is a block diagram of an electronic device according to an exemplary embodiment.

FIG. 23 is a block diagram showing an electronic device 2300 according to another exemplary embodiment. For example, the electronic device 2300 may be a mobile phone, a computer, a digital broadcast terminal, a message transceiver device, a game console, a tablet device, a medical equipment, a fitness equipment, a personal digital assistant, etc.

Referring to FIG. 23, the electronic device 2300 may include one or more of the following components: a processing component 2302, a memory 2304, a power component 2306, a multimedia component 2308, an audio component 2310, an input/output (I/O) interface 2312, a sensor component 2314, and a communication component 2316.

The processing component 2302 typically controls overall operations of the electronic device 2300, such as the operations associated with display, telephone calls, data communications, camera operations, and recording operations. The processing component 2302 may include one or more processors 2320 to execute instructions. Moreover, the processing component 2302 may include one or more modules which facilitate the interaction between the processing component 2302 and other components. For instance, the processing component 2302 may include a multimedia module to facilitate the interaction between the multimedia component 508 and the processing component 2302.

The memory 2304 is configured to store various types of data to support the operation of the electronic device 2300. Examples of such data include instructions for any applications or methods operated on the electronic device 2300, contact data, phonebook data, messages, pictures, video, etc. The memory 2304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The power component 2306 provides power to various components of the electronic device 2300. The power component 2306 may include a power management system, one or more power sources, and any other components associated with the generation, management, and distribution of power in the electronic device 2300.

The multimedia component 2308 includes a screen providing an output interface between the electronic device 2300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action.

The audio component 2310 is configured to output and/or input audio signals. For example, the audio component 2310 includes a microphone ("MIC") configured to receive an external audio signal when the electronic device 2300 is in an operation mode, such as a call mode, a recording mode or a voice recognition mode. The received audio signal may be further stored in the memory 2304 or transmitted via the communication component 2316. In some embodiments, the audio component 2310 further includes a speaker to output audio signals.

The I/O interface 2312 provides an interface between the processing component 2302 and peripheral interface modules such as a keyboard, a click wheel, buttons, and the like. The buttons may include, but are not limited to, a home button, a volume button, a starting button or a locking button.

The sensor component 2314 includes one or more sensors to provide status assessments of various aspects of the electronic device 2300. For instance, the sensor component 2314 may detect an open/closed status of the electronic device 2300, relative positioning of components, e.g., may be the display and the keypad of the electronic device 2300, may detect a change in position of the electronic device 2300 or a component of the electronic device 2300, a presence or absence of user contact with the electronic device 2300, an orientation or an acceleration/deceleration of the electronic device 2300 and a change in temperature of the electronic device 2300. The sensor component 2314 may include a proximity sensor configured to detect the presence of nearby objects without any physical contact. The sensor component 2314 may include a light sensor, such as a CMOS or CCD image sensor, for use in imaging applications as well. In some embodiments, the sensor component 2314 may include an accelerometer sensor, a gyroscope sensor, a magnetic sensor, a pressure sensor, or a temperature sensor as well.

The communication component 2316 is configured to facilitate communication, wired or wirelessly, between the electronic device 2300 and other devices. The electronic device 2300 can access a wireless network based on a communication standard, such as WiFi, 4G, or 5G, or a combination thereof. In one exemplary embodiment, the communication component 2316 receives a broadcast signal or broadcast-associated information from an external broadcast management system via a broadcast channel. In one exemplary embodiment, the communication component 2316 further includes a near field communication (NFC) module to facilitate short-range communications. In one exemplary embodiment, the communication component 2316 may be realized based on a radio frequency identification (RFID) technology, an infrared data association (IrDA) technology, an ultra-wideband (UWB) technology, a Bluetooth (BT) technology or other technologies.

In exemplary embodiments, the electronic device 2300 may be realized with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components.

In exemplary embodiments, there is also provided a non-transitory computer-readable storage medium including instructions, such as the memory 2304 including the instructions executable by the processor 2320 in the electronic device 2300, for performing the above-described methods. For example, the non-transitory computer-readable storage medium may be a ROM, a RAM, a CD-ROM, a magnetic tape, a floppy disc, an optical data storage device, and other electronic components.

After considering this description and carrying out the embodiments disclosed herein, those skilled in the art may easily think of other implementation aspects of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A passage determination method comprising:
   determining a target space region corresponding to a vehicle in a driving direction based on a real-time road image of the driving direction in a real scene;
   determining an actual size of the target space region;
   displaying indication information for instructing a user to adjust a coverage of the real scene by the real-time road image until the coverage at least includes the vehicle;
   in response to the vehicle being detected, determining a safe size of the vehicle; and
   determining whether the vehicle is able to pass through the target space region according to a magnitude relationship of the actual size of the target space region and the safe size of the vehicle.

2. The passage determination method according to claim 1, wherein the determining a target space region corresponding to a vehicle in a driving direction based on a real-time road image of the driving direction in a real scene comprises:
   determining, based on the real-time road image of the driving direction in the real scene, a boundary of a target object on a side of a road to be passed in the real-time road image; and
   determining the target space region based on the boundary of the target object.

3. The passage determination method according to claim 2, wherein the determining the target space region based on the boundary of the target object comprises:
   determining a preset key position point on the boundary of the target object;
   generating a vertical line segment that is perpendicular to ground based on the preset key position point;
   connecting vertical line segments at two sides of a road in the driving direction and at a same depth, to generate a cross section at the same depth in the driving direction; and
   connecting cross sections at a plurality of depths to generate the target space region.

4. The passage determination method according to claim 1, wherein the determining a target space region corresponding to a vehicle in a driving direction based on a real-time road image of the driving direction in a real scene comprises:
   determining a width that the vehicle is able to pass through;
   extending the width in the driving direction to form a target road surface region; and
   forming vertical surfaces vertical to a road surface based on a left boundary and a right boundary of the target road surface region to form the target space region;
   determining whether there is an obstacle object in the target space region based on the real-time road image of the driving direction in the real scene; and
   determining the formed target space region as the target space region corresponding to the driving direction of the vehicle, if there is no obstacle object in the target space region.

5. The passage determination method according to claim 1, wherein the method further comprises:
   generating a reminder message based on a determination result of whether the vehicle is able to pass through the target space region; and
   displaying a virtual image of the reminder message in the real scene.

6. The passage determination method according to claim 1, wherein the method further comprises:
   determining a travel route for driving to the target space region, if the vehicle is able to pass through the target space region; and
   displaying the travel route in the real scene.

7. The passage determination method according to claim 1, wherein the method further comprises:
   sending a control command to the vehicle to cause the vehicle to adjust a driving speed according to the control command, if the vehicle is unable to pass through the target space region.

8. A passage determination device comprising:
   a processor; and
   a memory storing instructions executable by the processor;
   wherein the processor is configured to:
   determine a target space region corresponding to a vehicle in a driving direction based on a real-time road image of the driving direction in a real scene;
   determine an actual size of the target space region;
   display indication information for instructing a user to adjust a coverage of the real scene by the real-time road image until the coverage at least includes the vehicle;
   in response to the vehicle being detected, determine a safe size of the vehicle; and
   determine whether the vehicle is able to pass through the target space region according to a magnitude relationship of the actual size of the target space region and the safe size of the vehicle.

9. The passage determination device according to claim 8, wherein the processor is further configured to:
   determine, based on the real-time road image of the driving direction in the real scene, a boundary of a target object on a side of a road to be passed in the real-time road image; and
   determine the target space region based on the boundary of the target object.

10. The passage determination device according to claim 9, wherein the processor is further configured to:
    determine a preset key position point on the boundary of the target object;
    generate a vertical line segment that is perpendicular to ground based on the preset key position point;

connect vertical line segments at two sides of the road in the driving direction and at a same depth to generate a section at the same depth in the driving direction; and connect cross sections at a plurality of depths to generate the target space region.

11. The passage determination device according to claim 8, wherein the processor is further configured to:

determine a width that the vehicle is able to pass through;

extend the width in the driving direction to form a target road surface region;

form vertical surfaces vertical to a road surface based on a left boundary and a right boundary of the target road surface region to form the target space region;

determine whether there is an obstacle object in the target space region based on the real-time road image of the driving direction in the real scene; and when there is no obstacle object in the target space region, determine the formed target space region as the target space region corresponding to the driving direction of the vehicle.

12. The passage determination device according to claim 8, wherein the processor is further configured to:

generate a reminder message based on a determination result of whether the vehicle is able to pass through the target space region; and display a virtual image of the reminder message in the real scene.

13. The passage determination device according to claim 8, wherein the processor is further configured to:

determine a travel route for driving to the target space region when the vehicle is able to pass through the target space region; and display the travel route in the real scene.

14. The passage determination device according to claim 8, wherein the processor is further configured to:

when the vehicle is unable to pass through the target space region, send a control command to the vehicle to cause the vehicle to adjust a driving speed according to the control command.

15. A non-transitory computer readable storage medium having instructions stored thereon that, when executed by a processor of a device, cause the device to perform a passage determination method comprising:

determining a target space region corresponding to a vehicle in a driving direction based on a real-time road image of the driving direction in a real scene;

determining an actual size of the target space region;

displaying indication information for instructing a user to adjust a coverage of the real scene by the real-time road image until the coverage at least includes the vehicle;

in response to the vehicle being detected, determining a safe size of the vehicle; and determining whether the vehicle is able to pass through the target space region according to a magnitude relationship of the actual size of the target space region and the safe size of the vehicle.

* * * * *